United States Patent
Lecourt et al.

(10) Patent No.: US 10,733,382 B2
(45) Date of Patent: Aug. 4, 2020

(54) METHOD AND SYSTEM FOR PROCESSING DATA USING AN AUGMENTED NATURAL LANGUAGE PROCESSING ENGINE

(71) Applicant: DATAMARAN LIMITED, London (GB)

(72) Inventors: Jean-Philippe Lecourt, London (GB); Jeltje Lecourt-Alma, London (GB); Jerome Basdevant, Valencia (ES); Emma Deraze, London (GB)

(73) Assignee: DATAMARAN LIMITED, London (GB)

( * ) Notice: Subject to any disclaimer, the term of this patent is extended or adjusted under 35 U.S.C. 154(b) by 0 days.

(21) Appl. No.: 15/736,552

(22) PCT Filed: Jun. 15, 2016

(86) PCT No.: PCT/GB2016/051784
§ 371 (c)(1),
(2) Date: Dec. 14, 2017

(87) PCT Pub. No.: WO2016/203231
PCT Pub. Date: Dec. 22, 2016

(65) Prior Publication Data
US 2018/0196799 A1    Jul. 12, 2018

(30) Foreign Application Priority Data
Jun. 15, 2015    (GB) .................................. 1510465.6

(51) Int. Cl.
*G06F 16/2458*    (2019.01)
*G06F 40/30*    (2020.01)
*G06F 16/35*    (2019.01)
*G06F 16/36*    (2019.01)

(52) U.S. Cl.
CPC ............ *G06F 40/30* (2020.01); *G06F 16/353* (2019.01); *G06F 16/367* (2019.01); *G06F 16/2458* (2019.01); *G06F 16/2465* (2019.01)

(58) Field of Classification Search
CPC ............................ G06F 17/27; G06F 16/2465
See application file for complete search history.

(56) References Cited

U.S. PATENT DOCUMENTS

| 9,966,089 | B2 * | 5/2018 | Totzke | ................. | G10L 21/10 |
| 2006/0031217 | A1 * | 2/2006 | Smith | ................. | G06K 9/00711 |
| 2006/0143175 | A1 * | 6/2006 | Ukrainczyk | .......... | G06F 17/218 |
| 2010/0074524 | A1 | 3/2010 | Stollman | | |
| 2013/0246049 | A1 * | 9/2013 | Mirhaji | ................. | G06F 40/211 |
| | | | | | 704/9 |

(Continued)

OTHER PUBLICATIONS

International Search Report for PCT/GB2016/051784, dated Sep. 19, 2016, 3 pages.

(Continued)

*Primary Examiner* — Feng-Tzer Tzeng
(74) *Attorney, Agent, or Firm* — Nixon & Vanderhye, P.C.

(57) ABSTRACT

The present invention relates to a method of processing data. The method including the steps of at least one processor tokenising text within at least one part of the data; and at least one processor matching tokenised text against an ontological framework using a plurality of rules to identify relevant topics within the data. A system is also disclosed.

16 Claims, 15 Drawing Sheets

(56) References Cited

U.S. PATENT DOCUMENTS

2015/0106157 A1    4/2015  Chang et al.

OTHER PUBLICATIONS

Nadkarni et al., "Natural language processing: an introduction", Journal of the American Medical Informatics Association, vol. 18, No. 5, Sep. 1, 2011, pp. 544-551.
European Examination Report Communication in EP Application No. 16 731 958.1 dated Oct. 8, 2018.

* cited by examiner 8.3-50%
9 US Gulf of Mexico Joint Interest Unit (2)
Joint interest offshore oil and gas fields in the Gulf of Mexico
5-44%
CoPPER
Ref Country Asset description ownership
10 Australia Cannington Silver, lead and zinc mine located in northwest Queensland
100%
11 Chile Escondida The world's largest copper producing mine, located in northern Chile
57.5%
12 Australia Olympic Dam Australia's biggest underground copper mine, also producing uranium, gold and silver
100%
13 Chile Pampa Norte Consists of the Cerro Colorado and Spence open-cut mines, producing copper cathode in northern Chile
100%
14 Peru Antamina (2) Open-cut copper and zinc mine, located in northern Peru
33.8%
IRon oRE
Ref Country Asset description ownership
15 Australia Western Australia Iron Ore
Integrated iron ore mine rail and port operations in the Pilbara region of Western Australia
85%
16 Brazil Samarco (2) Open-cut iron ore mine, concentrators and pelletising facilities
50%

Petroleum and Potash

Copper Iron Ore Coal Aluminum, Manganese and Nickel Offices
3227
26

500a, 500b (labels)

| Type | Set | Start | End | Id | Features |
|---|---|---|---|---|---|
| Token | | 1 | 15 | 1628 | {category=NNP, kind=word, length=14, orth=upperinitial, string=Sustainability} |
| Token | | 16 | 22 | 1630 | {category=NNP, kind=word, length=6, orth=upperinitial, string=Report} |
| Token | | 23 | 27 | 1632 | {category=CD, kind=number, length=4, string=2014} |
| Token | | 29 | 34 | 1635 | {category=NNP, kind=word, length=6, orth=upperinitial, string=Value} |
| Token | | 36 | 43 | 1638 | {category=IN, kind=word, length=7, orth=lowercase, string=through} |
| Token | | 45 | 58 | 1641 | {category=NN, kind=word, length=11, orth=lowercase, string=performance} |
| Token | | 59 | 68 | 1645 | {category=NNP, kind=word, length=9, orth=upperinitial, string=Petroleum} |
| Token | | 69 | 72 | 1647 | {category=CC, kind=word, length=3, orth=lowercase, string=and} |
| Token | | 73 | 79 | 1649 | {category=NNP, kind=word, length=6, orth=upperinitial, string=Potash} |
| Token | | 83 | 93 | 1654 | {category=NNP, kind=word, length=10, orth=mixedCaps, string=CopperIron} |
| Token | | 94 | 110 | 1656 | {category=NNP, kind=word, length=16, orth=mixedCaps, string=OreCoalAluminium} |
| Token | | 110 | 111 | 1657 | {category=, kind=punctuation, length=1, string=,} |
| Token | | 112 | 121 | 1659 | {category=NNP, kind=word, length=9, orth=upperinitial, string=Manganese} |
| Token | | 122 | 125 | 1661 | {category=CC, kind=word, length=3, orth=lowercase, string=and} |
| Token | | 126 | 139 | 1663 | {category=NNP, kind=word, length=13, orth=mixedCaps, string=NickelOffices} |

600b        600a on the things that matter most 7
Governance 8
Operating with integrity 9Conducting business transparently 11Addressing climate change 13
People 15
Keeping our people and operations safe 16Focusing on the health of our people 19Our people 23
Environment 26
Greenhouse gas emissions 27Biodiversity and land management 29Water stewardship 32
Society 36
Supporting and engaging with our communities 37Respecting human rights 41Making a positive contribution to society 42
Appendix 49
Our stakeholders 50Performance data 52Independent assurance report to the Directors and management of BHP Billiton 56
BHP Billiton is a leading diversified resources company. Our purpose is to create long-term shareholder value through the discovery, acquisition, development and marketing of natural resources. Headquartered in Melbourne, Australia, with operations in 130 locations in 21 countries, we have a diversified portfolio and are among the largest producers of major commodities, including iron ore metallurgical and energy coal, conventional and unconventional oil and gas, copper, aluminium, manganese, uranium, nickel and silver.
For further information on the Company, please visit our website at
A plan to demerge a selection of BHP Billiton's aluminium, coal, manganese, nickel and silver assets was announced in August 2014. This proposal would allow BHP Billiton to improve the productivity of its largest businesses more quickly and create a new global metals and mining company specifically designed to enhance the performance of the demerged assets. The transaction remains subject to regulatory approvals, Board approval and shareholder vote early in 2015.
BHP Billiton sustainability report 2014 - 1
environmental impacts within our area of influence and implemented compensatory actions to address residual impacts. We also continued to pursue opportunities that provide for the long-term endowment of areas of national and international conservation significance

| Type | Set | Start | End | Id | |
|---|---|---|---|---|---|
| esgrev | | 1634 | 1640 | 75298 | (P1=Emerging_trends&Innovation, P2=specific/awareness, P3=None, language=, majorType=env.i |
| esgrev | | 1747 | 1753 | 75299 | (P1=Emerging_trends&Innovation, P2=specific/awareness, P3=None, language=, majorType=env.i |
| esgrev | | 1764 | 1768 | 75300 | (P1=Emerging_trends&Innovation, P2=specific/awareness, P3=None, language=, majorType=env.i |
| esgrev | | 1793 | 1799 | 75301 | (P1=Emerging_trends&Innovation, P2=specific/awareness, P3=None, language=, majorType=env.i |
| esgrev | | 1874 | 1877 | 75302 | (P1=Environmental_footprint, P2=generic/action, P3=None, language=,majorType=env, minorType |
| esgrev | | 1895 | 1901 | 75303 | (P1=Emerging_trends&Innovation, P2=specific/awarenss, P3=None, language=, majorType=env,r |
| esgrev | | 1958 | 1962 | 75304 | (P1=Environmental_footprint, P2=generic/action, P3=None, language=,majorType=env, minorType |
| esgrev | | 1963 | 1969 | 75305 | (P1=Emerging_trends&Innovation, P2=specific/awarenss, P3=None, language=, majorType=env,r |
| esgrev | | 2118 | 2126 | 94137 | (P1=Emerging_trends&Innovation, P2=specific/awarenss, P3=None, language=, majorType=env,r |
| esgrev | | 2235 | 2238 | 75308 | (P1=Environmental_footprint, P2=generic/action, P3=None, language=,majorType=env, minorType |
| esgrev | | 2239 | 2247 | 94138 | (P1=Emerging_trends&Innovation, P2=specific/awarenss, P3=None, majorType=env, minorType=r |
| esgrev | | 2611 | 2614 | 75311 | (P1=Emerging_trends&Innovation, P2=specific/awareness, P3=None, language=, majorType=env,r |
| esgrev | | 3027 | 3033 | 75312 | (P1=Emerging_trends&Innovation, P2=specific/awareness, P3=None, language=, majorType=env,r |
| esgrev | | 3614 | 3617 | 75313 | (P1=Environmental_footprint, P2=generic/action, P3=None, language=,majorType=env, minorType |
| esgrev | | 3641 | 3645 | 75314 | (P1=Emerging_trends&Innovation, P2=specific/awarenss, P3=None, language=, majorType=env,r |

601

| F | G | H | I | J | K | L |
|---|---|---|---|---|---|---|
| human rights | soc | human_rights_general | Community | generic/awareness | None | 1 |
| positive contribution to society | ec | enhanced_value | Corporate_governance&Risk_management | generic/awareness | None | 1 |
| long-term shareholder | ec | longterm_shareholder_value | Corporate_governance&Risk_management | specific/awareness | None | 1 |
| marketing | soc | marketing_general | Customers | generic/awareness | None | 1 |
| natural resources | env | materials_commodities_general | Emerging_trends&Innovation | specific/awareness | None | 1 |
| commodities | env | materials_commodities_general | Emerging_trends&Innovation | specific/awareness | None | 1 |
| coal | env | materials_commodities_general | Emerging_trends&Innovation | specific/awareness | None | 1 |
| copper | env | materials_commodities_general | Emerging_trends&Innovation | specific/awareness | None | 1 |
| aluminium | env | materials_commodities_general | Emerging_trends&Innovation | specific/awareness | None | 1 |
| silver | env | materials_commodities_general | Emerging_trends&Innovation | specific/awareness | None | 1 |
| aluminium | env | materials_commodities_general | Emerging_trends&Innovation | specific/awareness | None | 1 |
| coal | env | materials_commodities_general | Emerging_trends&Innovation | specific/awareness | None | 1 |
| silver | env | materials_commodities_general | Emerging_trends&Innovation | specific/awareness | None | 1 |
| improve | env | actions_on_waste | Environmental_footprint | generic/action | None | 1 |
| improve | env | actions_on_building | Environmental_footprint | specific/action | None | 1 |

```
Emmas-iMac:~ emmaderaze$ python /datamaramlp_beta/bin/postGate_script/WC.py susty  /Users/emmaderaze/Desktop/_PATENT/_PATENT  /Users/emmaderaze/Desktop/_PATENT/Gate_exports
Doc_PATENT_susty_2015_05_12_1732.csv   /Users/emmaderaze/Desktop/_PATENT/Gate_exports/Main_PATENT_susty_2015_05_12_1732.csv  0
('doc type:', 'susty')
('output path:', '/Users/emmaderaze/Desktop/_PATENT')
('doc 1:', '/Users/emmaderaze/Desktop/_PATENT/Gate_exports/Doc_PATENT_susty_2015_05_12_1732.csv')
('doc 2:', '/Users/emmaderaze/Desktop/_PATENT/Gate_exports/Main_PATENT_susty_2015_05_12_1732.csv')
('percent', 0)
Successfully connected
Database version : 5.6.19-log
--- compiling susty/Integ results
('**** Number of tokens in DOCUMENT: ', [31685.0] )
('**** Number of ANNOTATIONS in DOCUMENT: ', [1201.0] )
('**** apt value for document ', [41] )
('**** coefficient 003 value for document ', [39_0] )
Warning: Using a password on the command line interface can be insecure.
Connecting to erevaluetest.cytbnwozyoab.eu-west-1.rds.amazonaws.com
Selecting database DM_beta_raw
Loading data from LOCAL file: /Users/emmaderaze/Desktop/_PATENT_susty_2015_05_12_1732.csv into Main_PATENT_susty_2015_05_12_1732
DM_beta_raw.Main_PATENT_susty_2015_05_12_1732: Records: 1281 Deleted: 0 Skipped: 0 Warnings: 8
Disconnecting from erevaluatest.Cytbnwozyoab.eu-west-1.rds.amazonaws.com
('SQL length of clone', 83)
('ten main results 1  ', 82)
Export summary created at: /Users/emmaderaze/Desktop/_PATENT/SUSTY_Main_PATENT_susty_2015_05_12_1732_MIM.csv
Emmas-iMac:~ emmaderaze$
```

FIG. 8

| | A | B | C | D | E | F |
|---|---|---|---|---|---|---|
| 31 | BHPBillitonSustainabilityReport2014_interactive.pdf_00068 | labour_rights_general | 10 | 3 | | |
| 32 | BHPBillitonSustainabilityReport2014_interactive.pdf_00068 | actions_on_GHG | 9 | 3 | | |
| 33 | BHPBillitonSustainabilityReport2014_interactive.pdf_00068 | wellbeing | 9 | 3 | | |
| 34 | BHPBillitonSustainabilityReport2014_interactive.pdf_00068 | climate_finance | 8 | 3 | | |
| 35 | BHPBillitonSustainabilityReport2014_interactive.pdf_00068 | product_stewardship | 8 | 3 | | |
| 36 | BHPBillitonSustainabilityReport2014_interactive.pdf_00068 | relief_and_disaster_aid | 8 | 3 | | |
| 37 | BHPBillitonSustainabilityReport2014_interactive.pdf_00068 | community_engagement | 7 | 3 | | |
| 38 | BHPBillitonSustainabilityReport2014_interactive.pdf_00068 | enhanced_value | 7 | 3 | | |
| 39 | BHPBillitonSustainabilityReport2014_interactive.pdf_00068 | marketing_general | 7 | 3 | | |
| 40 | BHPBillitonSustainabilityReport2014_interactive.pdf_00068 | water_general | 7 | 3 | | |
| 41 | BHPBillitonSustainabilityReport2014_interactive.pdf_00068 | actions_on_climate | 6 | 2 | | |
| 42 | BHPBillitonSustainabilityReport2014_interactive.pdf_00068 | community_impact_general | 6 | 2 | | |
| 43 | BHPBillitonSustainabilityReport2014_interactive.pdf_00068 | longterm_shareholder_value | 6 | 2 | | |
| 44 | BHPBillitonSustainabilityReport2014_interactive.pdf_00068 | recycling_general | 6 | 2 | | |
| 45 | BHPBillitonSustainabilityReport2014_interactive.pdf_00068 | water_pollution_and-wastewater | 6 | 2 | | |
| 46 | BHPBillitonSustainabilityReport2014_interactive.pdf_00068 | forests_general | 5 | 2 | | |
| 47 | BHPBillitonSustainabilityReport2014_interactive.pdf_00068 | vector_control_genral | 5 | 2 | | |
| 48 | BHPBillitonSustainabilityReport2014_interactive.pdf_00068 | waste_general | 5 | 2 | | |
| 49 | BHPBillitonSustainabilityReport2014_interactive.pdf_00068 | community_healthcare | 4 | 1 | | |
| 50 | BHPBillitonSustainabilityReport2014_interactive.pdf_00068 | employee_volunteering | 4 | 1 | | |
| 51 | BHPBillitonSustainabilityReport2014_interactive.pdf_00068 | responsible_business | 4 | 1 | | |
| 52 | BHPBillitonSustainabilityReport2014_interactive.pdf_00068 | supply_chain_management | 4 | 1 | | |
| 53 | BHPBillitonSustainabilityReport2014_interactive.pdf_00068 | community_education | 3 | 1 | | |
| 54 | BHPBillitonSustainabilityReport2014_interactive.pdf_00068 | employee_engagement | 3 | 1 | | |
| 55 | BHPBillitonSustainabilityReport2014_interactive.pdf_00068 | ESG_risk_management | 3 | 1 | | |
| 56 | BHPBillitonSustainabilityReport2014_interactive.pdf_00068 | fisheries_general | 3 | 1 | | |
| 57 | BHPBillitonSustainabilityReport2014_interactive.pdf_00068 | responsible_investment | 3 | 1 | | |

FIG. 9

| | A | B | C | D | E | F |
|---|---|---|---|---|---|---|
| 1 | docname | topic | sum | score | | |
| 2 | BHPBillitonSustainabilityReport2014_interactive.pdf_00068 | energy_use_reduction&efficiencies | 83 | 3 | | |
| 3 | BHPBillitonSustainabilityReport2014_interactive.pdf_00068 | actions_on_building | 72 | 3 | | |
| 4 | BHPBillitonSustainabilityReport2014_interactive.pdf_00068 | materials_commodities_general | 70 | 3 | | |
| 5 | BHPBillitonSustainabilityReport2014_interactive.pdf_00068 | Occupational_health_and_safety | 68 | 3 | | |
| 6 | BHPBillitonSustainabilityReport2014_interactive.pdf_00068 | emissions_general | 66 | 3 | | |
| 7 | BHPBillitonSustainabilityReport2014_interactive.pdf_00068 | GHG_general | 52 | 3 | | |
| 8 | BHPBillitonSustainabilityReport2014_interactive.pdf_00068 | climate_change_general | 45 | 3 | | |
| 9 | BHPBillitonSustainabilityReport2014_interactive.pdf_00068 | biodiversity_general | 35 | 3 | | |
| 10 | BHPBillitonSustainabilityReport2014_interactive.pdf_00068 | human_rights_general | 32 | 3 | | |
| 11 | BHPBillitonSustainabilityReport2014_interactive.pdf_00068 | actions_on_waste | 31 | 3 | | |
| 12 | BHPBillitonSustainabilityReport2014_interactive.pdf_00068 | community_support_and_development | 29 | 3 | | |
| 13 | BHPBillitonSustainabilityReport2014_interactive.pdf_00068 | land_general | 28 | 3 | | |
| 14 | BHPBillitonSustainabilityReport2014_interactive.pdf_00068 | water_use_reduction_and_efficiency | 24 | 3 | | |
| 15 | BHPBillitonSustainabilityReport2014_interactive.pdf_00068 | workforce_diversity_and_inclusion | 24 | 3 | | |
| 16 | BHPBillitonSustainabilityReport2014_interactive.pdf_00068 | local-economy | 20 | 3 | | |
| 17 | BHPBillitonSustainabilityReport2014_interactive.pdf_00068 | actions_on_emissions | 19 | 3 | | |
| 18 | BHPBillitonSustainabilityReport2014_interactive.pdf_00068 | air_emissions_general | 18 | 3 | | |
| 19 | BHPBillitonSustainabilityReport2014_interactive.pdf_00068 | anti-corruption_and_bribery | 17 | 3 | | |
| 20 | BHPBillitonSustainabilityReport2014_interactive.pdf_00068 | actions_on_biodiversity | 16 | 3 | | |
| 21 | BHPBillitonSustainabilityReport2014_interactive.pdf_00068 | stakeholder_engagement_and_inclusion | 16 | 3 | | |
| 22 | BHPBillitonSustainabilityReport2014_interactive.pdf_00068 | direct_and_indirect_economic_value_creation | 15 | 3 | | |
| 23 | BHPBillitonSustainabilityReport2014_interactive.pdf_00068 | employee_development | 15 | 3 | | |
| 24 | BHPBillitonSustainabilityReport2014_interactive.pdf_00068 | buildings_general | 14 | 3 | | |
| 25 | BHPBillitonSustainabilityReport2014_interactive.pdf_00068 | social_inclusion | 13 | 3 | | |
| 26 | BHPBillitonSustainabilityReport2014_interactive.pdf_00068 | actions_on_land | 11 | 3 | | |
| 27 | BHPBillitonSustainabilityReport2014_interactive.pdf_00068 | energy_use | 11 | 3 | | |
| 28 | BHPBillitonSustainabilityReport2014_interactive.pdf_00068 | philanthropy | 11 | 3 | | |
| 29 | BHPBillitonSustainabilityReport2014_interactive.pdf_00068 | ESG_management | 10 | 3 | | |
| 30 | BHPBillitonSustainabilityReport2014_interactive.pdf_00068 | grievance_mechanisms | 10 | 3 | | |

FIG. 9A
(continued)

0000797400214 0000117801.sgm.20140303 20140303140057 ACCESSION NUMBER:0000797468-14-000011 CONFORMED SUBMISSION TYPE: 10-K PUBLIC DOCUMENT COUNT: 32 CONFORMED PERIOD OF REPORT: 20131231 FILED AS OF DATE: 20140303 DATE AS OF CHANGE: 20140303 FILER: COMPANY DATA: COMPANY CONFORMED NAME: OCCIDENTAL PETROLEUM CORP /DE/ CENTRAL INDEX KEY: 0000797468 STANDARD INDUSTRIAL CLASSIFICATION: CRUDE PETROLEUM & NATURAL GAS [1311] IRS NUMBER: 954035997 STATE OF INCORPORATION: DE FISCAL YEAR END: 1231 FILING VALUE: FORM TYPE: 10-K SEC ACT: 1934 Act SEC FILE NUMBER: 001-09210 FILM NUMBER: 14659668 BUSINESS ADDRESS: STREET 1: 10889 WILSHIRE BLVD CITY: LOS ANGELES STATE: CA ZIP: 90024 BUSINESS PHONE: 3102088800 MAIL ADDRESS: STREET 1: 10889 WILSHIRE BOULEVARD CITY: LOS ANGELS STATE: CA ZIP: 90024 1 oxy10k 12-31x2013.HTM 10-K OXY 10K 12-31-2013

1000a    1000b

UNITED STATES SECURITIES AND EXCHANGE COMMISSION
Washington, D.C. 20549

Form 10-K
b Annual Report Pursuant to Section 13 of 15(d) of the Securities Exchange Act of 1934

Transition Report Pursuant to Section 13 or 15(d) of the Securities Exchange Act of 1934

For the fiscal year ended December 31, 2013

For the transition period from          to

Commission File Number 1-9210

Occidental Petroleum Corporation
(Exact name of registrant as specified in its charter)

State or other jurisdiction of incorporation or organization

| Type | Set | Start | End | Id | Features |
|---|---|---|---|---|---|
| Token |  | 0 | 10 | 68421 | {category=CD, kind=number, length=10, string=0000797468} |
| Token |  | 10 | 11 | 68422 | {category=:, kind=punctuation, length=1, string=:, subkind=dashpunct} |
| Token |  | 11 | 13 | 68423 | {category=CD, kind=number, length=2, string=14} |
| Token |  | 13 | 14 | 68424 | {category=:, kind=punctuation, length=1, string=-, subkind=dashpunct} |
| Token |  | 14 | 20 | 68425 | {category=CD, kind=number, length=6, string=000011} |
| Token |  | 20 | 21 | 68426 | {category=kind=punctuation, length=1, string=.} |
| Token |  | 21 | 24 | 68427 | {category=NN, kind=word, length=3, orth=lowercase, string=hdr} |
| Token |  | 24 | 25 | 68428 | {category=:, kind=punctuation, length=1, string=.} |
| Token |  | 25 | 29 | 68429 | {category=NN, kind=word, length=4, orth=lowercase, string=sgm} |
| Token |  | 30 | 31 | 68431 | {category=:, kind=punctuation, length=1, string=.} |
| Token |  | 32 | 40 | 68433 | {category=CD, kind=number, length=8, string=20140303} |
| Token |  | 41 | 55 | 68435 | {category=CD, kind=number, length=14, string=20140303140057} |
| Token |  | 56 | 65 | 68437 | {category=NNP, kind=word, length=9, orth=allCaps, string=ACCESSION} |
| Token |  | 66 | 72 | 68439 | {category=NN, kind=word, length=6, orth=allCaps, string=NUMBER} |
| Token |  | 72 | 73 | 68440 | {category=:, kind=punctuation, length=1, string=:} |
| Token |  | 74 | 84 | 68442 | {category=CD, kind=number, length=10, string=0000797468} |

Item 3
Legal Proceedings          1100
..................................................................................................................................................
..............
8

Item 4
Mine Safety Disclosures
..................................................................................................................................................
8

Executive Officers
..................................................................................................................................................
............
8

Part II

Item 5
Market for Registrant's Common Equity, Related Stockholder Matters and Issuer Purchases of Equity Securities.....................
9

Item 6
Selected Financial Data
..................................................................................................................................................
11

| Features |
| --- |
| {item=3, rule=sec_key_section_3} |
| {item=4, rule=sec_key_section_4} |
| {item=6, rule=sec_key_section_6} |
| {item=11, rule=sec_key_section_11} |
| {item=11, rule=sec_key_section_11} |
| {item=3, rule=sec_key_section_3} |
| {item=4, rule=sec_key_section_4} |
| {item=6, rule=sec_key_section_6} |
| {item=11, rule=sec_key_section_11} |
| {item=11, rule=sec_key_section_11} |

1200a based employees and 1,200 foreign-based employees are represented by labor unions.
Occidental has a long-standing strict policy to provide fair and [equal employment] opportunities to all applicants and employees.

ENVIRONMENTAL REGULATION
For environmental regulation information, including associated costs, see the information under the heading "Environmental Liabilities and Expenditures" in the MD&A section of this report and "Risk Factors."

AVAILABLE INFORMATION
Occidental makes the following information available free of charge on its website at www.oxy.com:

Forms 10-K, 10-Q, 8-K and amendments to these forms as soon as reasonably practicable after they are electronically filed with, or furnished to the Securities and Exchange Commission (SEC);

Other SEC filings, including Forms 3, 4 and 5; and

Corporate governance information, including its corporate governance guidelines, board-committee charters and Code of Business Conduct. (See Part III, Item 10, of this report for further information.)

Information contained on Occidental's website is not part of this report.

ITEM 1A RISK FACTORS  1200b
Voltile global and local [commodity] pricing strongly affects Occidental's results of operations.
Occidental's financial results correlate closely to the prices it obtains for its products, particularly oil and, to a lesser extent natural gas and NGls and its chemical products.

| Type | Set | Start | End | Id | |
|------|-----|-------|-----|-----|---|
| esgrev | | 1482 | 1489 | 246031 | {P1=Emerging_trend&Innovation, P2=generic/awareness, P3=None, language=, majorType=env. |
| esgrev | | 15172 | 15179 | 246032 | {P1=Emerging_trend&Innovation, P2=generic/awareness, P3=None, language=, majorType=env. |
| esgrev | | 15577 | 15586 | 246033 | {P1=Customers, P2=generic/awareness, P3=None, language=, majorType=soc,minorType=marke |
| esgrev | | 15620 | 15629 | 246034 | {P1=Customers, P2=generic/awareness, P3=None, language=, majorType=soc,minorType=marke |
| esgrev | | 15729 | 15743 | 246035 | {P1=climate_change, P2=specific/awareness, P3=None, language=, majorType=env, minorType= |
| esgrev | | 15880 | 15891 | 246036 | {P1=Emerging_trends&Innovation, P2=specific/awareness, P3=None, language=, majorType=env, |
| esgrev | | 15925 | 15934 | 246037 | {P1=Customers, P2=generic/awareness, P3=None, language=, majorType=soc,minorType=marke |
| esgrev | | 19238 | 19250 | 246038 | {P1=Emerging_trends&Innovation, P2=specific/awareness, P3=None, language=, majorType=env, |
| esgrev | | 19541 | 19551 | 246039 | {P1=Environmental_footprint, P2=specific/action, P3=None, language=majorType=env. minorType |
| esgrev | | 19711 | 19718 | 246040 | {P1=Environmental_footprint, P2=specific/action, P3=None, language=majorType=env. minorType |
| esgrev | | 19795 | 19812 | 246041 | {P1=Employees, P2=specific/awareness, P3=None, language=, majorType=soc, minorType=skilled |
| esgrev | | 20865 | 20870 | 246042 | {P1=Emerging_trends&Innovation, P2=specific/awareness, P3=None, language=, majorType=env, |
| esgrev | | 21584 | 21593 | 246043 | {P1=Emerging_trends&Innovation, P2=specific/awareness, P3=None, language=, majorType=env, |
| esgrev | | 21709 | 21713 | 246044 | {P1=Emerging_trends&Innovation, P2=specific/awareness, P3=None, language=, majorType=env, |
| esgrev | | 21852 | 21861 | 246045 | {P1=Customers, P2=generic/awareness, P3=None, language=, majorType=soc,minorType=marke |

| Feature 3 | Value 3 | Feature 4 | Value 4 | Feature 5 | Value 5 |
|---|---|---|---|---|---|
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |
| P1 | Community | P2 | generic/action | P3 | None |

FIG. 13

| List name | Major | Mir |
|---|---|---|
| esgrev_ec_alternative_accounting.lst | ec | alternative_accounting |
| esgrev_ec_alternative_bonds.lst | ec | alternative_bonds |
| esgrev_ec_alternative_finance_products.lst | ec | alternative_finance_pro |
| esgrev_ec_climate_finance.lst | ec | climate_finance |
| esgrev_ec_direct_and_indirect_economic_value_creation.lst | ec | direct_and_indirect_eco |
| esgrev_ec_enchanced_value.lst | ec | enchanced_value |
| esgrev_ec_financial_inclusion.lst | ec | financial_inclusion |
| esgrev_ec_financial_literacy.lst | ec | financial_literacy |
| esgrev_ec_local_economy.lst | ec | local_economy |
| esgrev_ec_local_infrastructure_investments.lst | ec | local_infrastructure_inv |
| esgrev_ec_long_term_productivity.lst | ec | long_term_productivity |
| esgrev_ec_longterm_shareholder_value.lst | ec | longterm_shareholder_value |
| esgrev_ec_market_access.lst | ec | market_access |
| esgrev_ec_responsible_investment.lst | ec | responsible_investment |
| esgrev_ec_responsible_procurement_practices.lst | ec | responsible_procurement_practices |
| esgrev_ec_shareholder_activism.lst | ec | shareholder_activism |
| esgrev_env_GHG_general.lst | env | GHG_general |
| esgrev_env_actions_on_GHG.lst | env | actions_on_GHG |
| esgrev_env_actions_on_air_emissions.lst | env | actions_on_air_emissions |
| esgrev_env_actions_on_biodiversity.lst | env | actions_on_biodiversity |
| esgrev_env_actions_on_building.lst | env | actions_on_building |
| esgrev_env_actions_on_climate.lst | env | actions_on_climate |
| esgrev_env_actions_on_emissions.lst | env | actions_on_emissions |
| esgrev_env_actions_on_fisheries.lst | env | actions_on_fisheries |
| esgrev_env_actions_on_forestry.lst | env | actions_on_forestry |
| esgrev_env_actions_on_land.lst | env | actions_on_land |
| esgrev_env_actions_on_materials_commodities.lst | env | actions_on_materials_commodities |
| esgrev_env_actions_on_spills.lst | env | actions_on_spills |
| esgrev_env_actions_on_waste.lst | env | actions_on_waste |
| esgrev_env_air_emissions_general.lst | env | air_emissions_general |
| esgrev_env_alternative_fuels.lst | env | alternative_fuels |
| esgrev_env_biodiversity_general.lst | env | biodiversity_general |
| esgrev_env_buildings_general.lst | env | buildings_general |
| esgrev_env_climate_change_general.lst | env | climate_change_general |
| esgrev_env_eco-efficient_employee_mobility.lst | env | eco-efficient_employee_mobility |
| esgrev_env_eco-efficient_transport_practices.lst | env | eco-efficient_transport_practices |
| esgrev_env_emissions_general.lst | env | emissions_general |
| esgrev_env_employee_mobility_general.lst | env | employee_mobility_general |
| esgrev_env_energy_use.lst | env | energy_use |
| esgrev_env_energy_use_reduction&efficiencies.lst | env | energy_use_reduction&efficiencies |
| esgrev_env_fisheries_general.lst | env | fisheries_general |
| esgrev_env_forests_general.lst | env | forests_general |
| esgrev_env_harmful_substances.lst | env | harmful_substances |
| esgrev_env_hazardous_waste.lst | env | hazardous_waste |
| esgrev_env_land_general.lst | env | land_general |
| esgrev_env_materials_commodities_general.lst | env | materials_commodities_general |
| esgrev_env_product_and_service_safety.lst | env | product_and_service_safety |
| esgrev_env_product_eco-efficiency_and_impact.lst | env | product_eco-efficiency_and_impact |
| esgrev_env_product_labelling.lst | env | product_labelling |
| esgrev_env_product_stewardship.lst | env | product_stewardship |
| esgrev_env_product_take-back.lst | env | product_take-back |
| esgrev_env_recycling_general.lst | env | recycling_general |

FIG. 13A
(continued)

| Value | Feature 1 | Value 1 | Feature 2 | Value 2 |
|---|---|---|---|---|
| building capacity for local | term | building capacity for local | weight | 1.0 |
| building capacity for locals | term | building capacity for locals | weight | 1.0 |
| capacity building | term | capacity building | weight | 1.0 |
| capacity of local | term | capacity of local | weight | 1.0 |
| developing local talent | term | developing local talent | weight | 1.0 |
| employ local | term | employ local | weight | 1.0 |
| employ locally | term | employ locally | weight | 1.0 |
| help locals recover economically | term | help locals recover economically | weight | 1.0 |
| help locals recover financially | term | help locals recover financially | weight | 1.0 |
| help residents recover economically | term | help residents recover economically | weight | 1.0 |
| help residents recover financially | term | help residents recover financially | weight | 1.0 |
| hire locally | term | hire locally | weight | 1.0 |
| hiring local talent | term | hiring local talent | weight | 1.0 |
| local buying | term | local buying | weight | 1.0 |
| local capacity | term | local capacity | weight | 1.0 |
| local capacity-building | term | local capacity-building | weight | 1.0 |
| local development | term | local development | weight | 1.0 |
| local economic | term | local economic | weight | 1.0 |
| local economy | term | local economy | weight | 1.0 |
| local employ | term | local employ | weight | 1.0 |
| local employment | term | local employment | weight | 1.0 |
| local hiring | term | local hiring | weight | 1.0 |
| local job | term | local job | weight | 1.0 |
| local jobs | term | local jobs | weight | 1.0 |
| locally hired | term | locally hired | weight | 1.0 |
| locally sourcing | term | locally sourcing | weight | 1.0 |
| local procurement | term | local procurement | weight | 1.0 |
| local sourcing | term | local sourcing | weight | 1.0 |
| local spend | term | local spend | weight | 1.0 |
| local suplier | term | local suplier | weight | 1.0 |
| local supliers | term | local supliers | weight | 1.0 |
| local supply | term | local supply | weight | 1.0 |
| procure local | term | procure local | weight | 1.0 |
| procure locally | term | procure locally | weight | 1.0 |
| procuring local | term | procuring local | weight | 1.0 |
| procuring locally | term | procuring locally | weight | 1.0 |
| products purchased locally | term | products purchased locally | weight | 1.0 |
| purchase local | term | purchase local | weight | 1.0 |
| purchasing products locally | term | purchasing products locally | weight | 1.0 |
| purchasing services locally | term | purchasing services locally | weight | 1.0 |
| regional economy | term | regional economy | weight | 1.0 |
| revenues for the region | term | revenues for the region | weight | 1.0 |
| self-sufficient local economies | term | self-sufficient local economies | weight | 1.0 |
| services purchased locally | term | services purchased locally | weight | 1.0 |
| sourcing local | term | sourcing local | weight | 1.0 |
| sourcing locally | term | sourcing locally | weight | 1.0 |
| spend locally | term | spend locally | weight | 1.0 |
| suppliers in the community | term | suppliers in the community | weight | 1.0 |
| suppliers locally | term | suppliers locally | weight | 1.0 |

FIG. 13B
(continued)

METHOD AND SYSTEM FOR PROCESSING DATA USING AN AUGMENTED NATURAL LANGUAGE PROCESSING ENGINE

This application is the U.S. national phase of International Application No. PCT/GB2016/051784 filed 15 Jun. 2016, which designated the U.S. and claims priority to GB Patent Application No. 1510465.6 filed 15 Jun. 2015, the entire contents of each of which are hereby incorporated by reference.

FIELD OF INVENTION

The present invention is in the field of data processing. More particularly, but not exclusively, the present invention relates to processing data using an augmented natural language processing (NLP) engine.

BACKGROUND

Unstructured data is widespread across multiple industries and across the Internet. Techniques exist for processing unstructured data into a form that may be of greater use. In relation to text, the key cluster of techniques used are known as Natural Language Processing (NLP).

A standard technique from NLP in structuring data for analysis involves the use of tokenisation. Tokenisation breaks a text document down into words, phrases, or other meaningful elements called tokens. The number of occurrences of each token in the document can be used along with hand written rules to guess the nature of the document and the topics covered by the document.

The disadvantage of such generic approach is that it provides a broad approach to processing documents which results, therefore, in less accurate outcomes.

There is a desire for an improved data processing method and system which can be optimised for specific fields.

It is an object of the present invention to provide a method and system of processing data using an augmented natural language processing engine which overcomes the disadvantages of the prior art, or at least provides a useful alternative.

SUMMARY OF INVENTION

According to a first aspect of the invention there is provided a method of processing data, including:
at least one processor tokenising text within at least one part of the data; and at least one processor matching tokenised text against an ontological framework using a plurality of rules to identify relevant topics within the data.

At least some of the plurality of rules may relate to grammar.

The relevance of each of the topics may be assigned one of a plurality of relevancy levels (i.e. high, medium or low).

The data may be classified into one of a plurality of categories (for example, sustainability reports, financial reports, security filings, integrated reports, sustainability web sites).

Each category may be associated with at least one relevancy rule, and each topic may be assigned to one of a plurality of relevancy levels in accordance with the at least one associated relevancy rule.

The data may be comprised of a plurality of parts and the category for the data may define the at least one part of the data that is to be tokenised.

The data may be extracted from one of a plurality of sources.

Each source may correspond to one of the categories.

The method may be applied to a plurality of data and at least some of the plurality of data is classified within different categories.

The method may further including a step of determining relevant topics across the plurality of data using a plurality of further rules.

At least some of the plurality of further rules may be associated with a specific category of the plurality of categories and are used in relation to data within that specific category.

At least one of the plurality of rules may specify only tokenised text within specified portions of the data are matched against the ontological framework.

The ontological framework may comprise, at least, a plurality of topics, each associated with a plurality of terms.

According to a further aspect of the invention there is provided a system for processing data, including:
at least one processor configured for tokenising text within at least one part of the data, and matching tokenised text against an ontological framework using a plurality of rules to identify relevant topics within the data; and
at least one memory configured for storing the data, the ontological framework and the plurality of rules.

Other aspects of the invention are described within the claims.

BRIEF DESCRIPTION OF THE DRAWINGS

Embodiments of the invention will now be described, by way of example only, with reference to the accompanying drawings in which:

FIG. 5: shows a document and table illustrating tokenisation of a sustainability document via application of a method in accordance with an embodiment of the invention;

FIG. 6: shows a document and table illustrating annotation of a sustainability document via application of a method in accordance with an embodiment of the invention;

FIG. 7: shows a CSV (comma separated variable) file generated from the annotated document of FIG. 6 via a method in accordance with an embodiment of the invention;

FIG. 8: shows a screenshot illustrating scoring of topics via a method in accordance with an embodiment of the invention;

FIG. 9: shows a table illustrating clustering of topics via a method in accordance with an embodiment of the invention;

FIG. 10: shows a document and table illustrating tokenisation of a 10K document via application of a method in accordance with an embodiment of the invention;

FIG. 11: shows a document and table illustrating rules identifying sections via a method in accordance with an embodiment of the invention;

FIG. 12: shows a document and table illustrating annotation of a 10K document via application of a method in accordance with an embodiment of the invention; and FIG. 13: shows a table illustrating an exemplary gazetteer extracted from an ontology used with an embodiment of the invention.

DETAILED DESCRIPTION OF PREFERRED EMBODIMENTS

The present invention provides a method and system of processing data using an augmented natural language processing engine.

The inventors have been attempting to solve the problem of processing publicly available documents within a specific field, namely, Corporate Social Responsibility and Sustainability. In solving this problem, the inventors noticed that the different documents available fall into different categories. Furthermore, within the specific field, certain words, combination of words and phrases are relevant to certain topics.

The inventors discovered that they can improve a natural language processing engine for processing documents in specific fields by constructing an ontology for that field where relevant words, combination of words and phrases are associated with certain topics, and by using rules to detect or weight the occurrence of words and phrases within the documents. These rules may be assigned to each category such that documents within that category utilise those assigned rules in processing. This results in a method and system which can identify relevant topics within and across documents.

Figure 1:
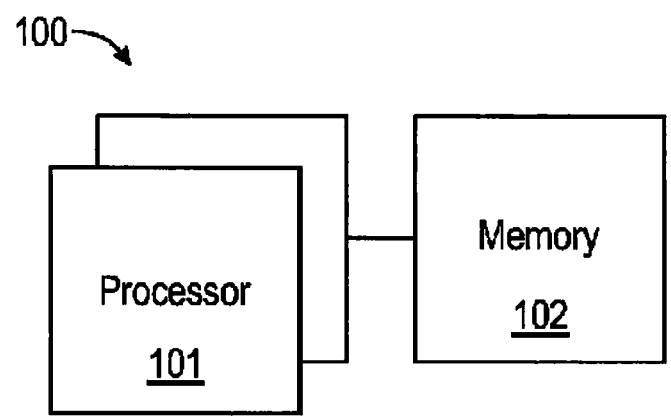
FIG. 1: shows a block diagram illustrating a system in accordance with an embodiment of the invention.

In FIG. 1, a system 100 in accordance with an embodiment of the invention is shown.

The system 100 includes one or more processors 101 and a memory 102.

At least one of the processors 101 is configured to process data by tokenising text within the data.

Figure 3:
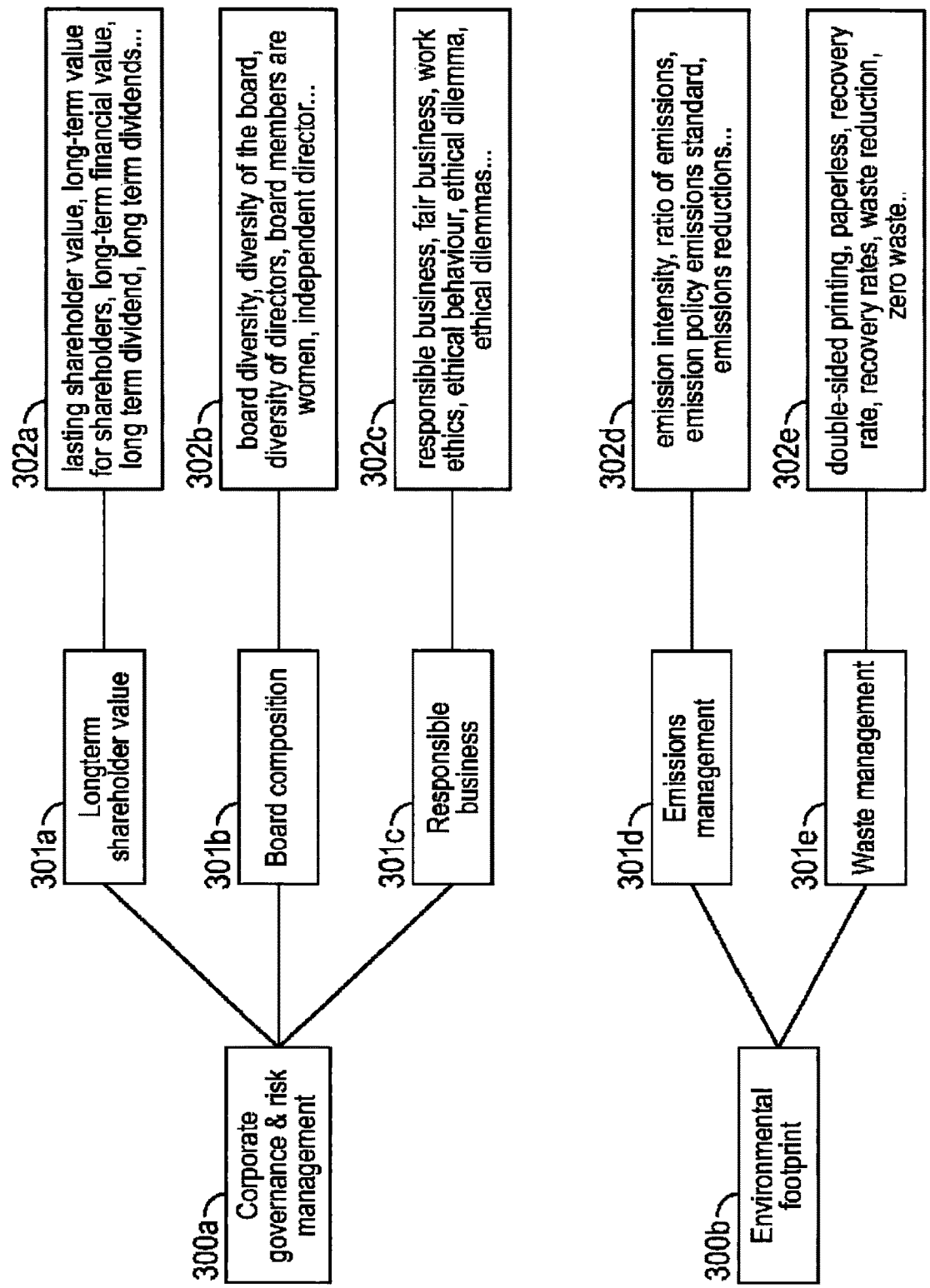
FIG. 3: shows a table illustrating a portion of an exemplary ontology for use with an embodiment of the invention.
Figure 4:
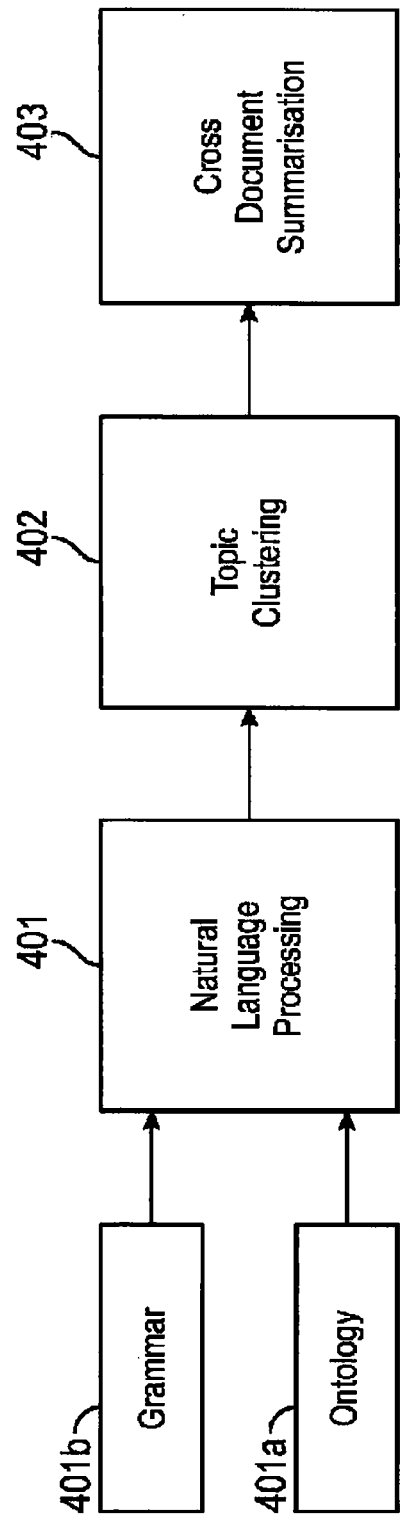
FIG. 4: shows a flow diagram illustrating a method in accordance with an embodiment of the invention.

At least one of the processors 101 is further configured to match the tokenised text against an ontological framework (e.g. as shown in FIG. 3) using a plurality of rules to identify relevant topics within the data.

The memory 102 may be configured to store the data, the ontological framework, and the plurality of rules.

The system 100 may be a single apparatus or distributed across a plurality of apparatus and linked via a communications system or network.

Figure 2:
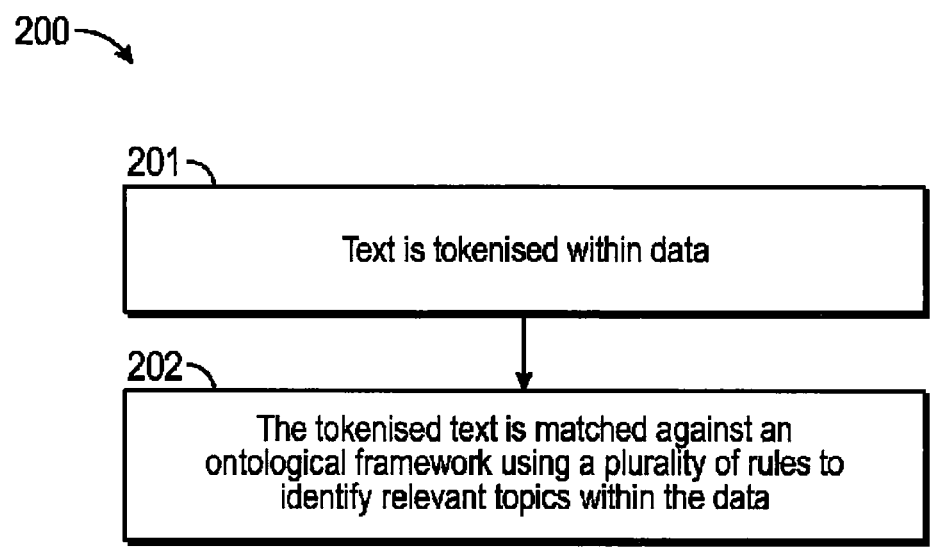
FIG. 2: shows a flow diagram illustrating a method in accordance with an embodiment of the invention.

Referring to FIG. 2, a method 200 in accordance with an embodiment of the invention will be described.

In step 201, a processor (e.g. processor 101) tokenises text within data.

Tokenisation involves splitting up a text using a vocabulary and rules into terms and punctuation.

In step 202, a processor (e.g. processor 101) matches the tokenised text against an ontological framework using a plurality of rules to identify relevant topics within the data.

At least part of the tokenised text may be matched against the terms within the ontological framework. Each matching term is associated with a topic such that occurrences of a matching term within the document are associated with a topic.

The plurality of rules may include any of the following rules:
 a) identifying locations within the data to use tokenised text;
 b) identifying locations within the data to define weights for the tokenised text; and
 c) classifying the located topics on degree of importance.

The plurality of rules may be selected from a larger set of rules. The plurality of rules may be selected based upon a category for the data. For example, when the method is applied in relation to Corporate Social Responsibility and Sustainability, the data may be categorised into one of sustainability report, SEC filing, financial annual report, integrated report and Web sites, and each of the categories may be associated with a specific selection of rules.

The number of associations within the document for each topic is used to generate a ranking for the topics from the ontology. One or more of the plurality of rules may identify whether the associations are used to contribute to the ranking based upon the location of the matched terms (e.g. only terms within specific sections of the document contribute).

One or more of the plurality of rules may increase the weight given to certain associations (for example, based upon the location of the matched terms such as terms within a key section of the document).

In one embodiment, multiple matching terms associated with one topic within a single sentence are weighted the same as a single matching term associated with the topic in a sentence.

One or more of the plurality of rules may be used to classify the topics on degree of importance (e.g. high, medium, low importance). For example, if the document has 40 topics, then the top 30% may be classified as high; out of the remaining topics, if the topic has over 4 associations then it is classified as medium; and the remaining topics may be classified as low.

In one embodiment, the above method is applied to a plurality of data as shown at step 503. Each data may represent a document. In this embodiment, a further step 504 may be included to determine the relevancy of topics across the plurality of data. At some of the data may fall within different categories. For example, one document may be a sustainability report, and another document may be a financial report. The further step may utilise rules based upon the category of the data to determine the weight or relevance of the classification of topics for that document. The further step may, for each topic, classify the topic across the plurality of data based upon any one or combination of the following:
 a) where multiple data exist within a category, the highest classification given to that topic across that category;
 b) if a predefined category specifies a higher classification for the topic than other categories, the classification of that predefined category (for example, if a financial report classifies a topic as high and a sustainability report classifies a topic as medium than the topic across the reports is classified as high); and/or
 c) an average for the classification of the topic across the data.

In one embodiment, the method may include a yet further step of generating a proportional importance for a topic within a data or across a plurality of data may be generated for an entity (for example, a company). This proportional importance may be measured against other entities or against earlier or later generated data to provide a comparison within a cluster of entities or across time respectively.

For illustrative purposes only, FIG. 3 shows a portion of an exemplary ontological framework for use with an embodiment of the invention.

The ontological framework may include a plurality of categories (300a and 300b), each category (300a and 300b) associated with a plurality of topics (301a to 301e), and each topic (301a to 301e) may be associated with a plurality of terms (302a to 302e). The terms (302a to 302e) may be words, phrases or other units of information which can be tokenised within text.

In the example shown in FIG. 3, category 300a is "Corporate governance & Risk management". This is associated with three topics (301a, 301b, and 301c). Topic 301a is "Longterm shareholder value" and is associated with a plurality of terms 302a (lasting shareholder value, long-term value for shareholders, long-term financial value, long term dividend, long term dividends and others not shown).

With reference to FIGS. 4 to 13, embodiments of the invention will now be described where the data are documents relating to the field of Corporate Social Responsibility and Sustainability. It will be appreciated that, although embodiments of the invention may be particularly useful in this field, embodiments of the invention may be usefully applied in other fields.

Natural Language Processing (Step 401)

a) Documents are processed from original format (pdf or html) into text. In one embodiment, five different document types may be processed: sustainability report (susty), SEC filing (10k, 20f or 40f), Financial annual report (FinAR), Integrated report (Integ) and Web sites.
b) The text is then parsed, sentences and pages extracted, and the text is tokenized.
c) Tokens are matched against the ontology 401a for identification of terms. Matches are called annotations.
d) Generic grammar rules 401b are then applied. Examples of rules include
  i) Terms count as only one topic;
  ii) For sustainability reports:
    CEO letter: search for a CEO letter at the beginning of the Susty report and give the topics that occur in it an advantage in the score; and
  iii) For SEC filings:
    Tokens are only matched to terms in specific sections (for example, items 1, 1A and 7 for 10k, items 3, 4, 6, 11, 16G, 16H in 20f)
e) Data is then exported in the form of three files:
  i) One file that contains all annotations, their location in the document and their correspondence with the ontology;
  ii) One file that contains document-specific information (number of words, annotations, sentences, pages . . . ); and
  iii) A fully annotated document for visualization.

Details of the NLP Process

Each document is analysed following a predefined flow. Throughout this flow, the initial document is enriched with annotations (e.g. metadata).

The NLP process consists of the following steps:

Step A: a document reset process that clears all previously existing annotations in the document;
Step B: text is tokenized (individual items such as words and punctuation are identified);
Step C: a Gazetteer is matched against the tokens found. The gazetteer is composed of a series of list files extracted from the Ontology 401a (in table format). It defines a multi-level hierarchical structures (such as high to low: Categories, Buckets, Topics, Terms). Terms are indicators of a Topic's presence in the document and are annotated as such;
Step D: a Part-of-Speech tagger identifies the syntactic identity of each token; and
Step E: a series of Grammar rules are applied on the output of the previous steps (identifying metadata such as sentences and page numbers, and/or limit an ambiguous term or series of terms to one topic).

The output of that process is a document fully annotated with reference to the ontology framework (topics) and other relevant metadata Topic Clustering (Step 402)

The objective of topic clustering is to identify the importance of each topic in a given document.

At this stage a document is annotated with Topics.

A topic is only counted once per sentence (counts after this are counts of annotated sentences, not counts of words/terms.)

For each document, a score is assigned per topic. A topic can be High, Medium or Low. The High/Medium/Low calculation differs for each document type as show below:
a) For Susty Documents:
Key Section Application
Objective Previous step allocates a number of High topics per document. This allocation's size remains unchanged but the topics' distribution can be modified depending on what was defined as Key section:

Example 1 doc has 15 High topics
12 topics were found in Key section
8 of those were previously High: those are unchanged
2 of those were previously Medium: they are now boosted up to High
2 of those were previously Low: they are now boosted up to Medium
There are now 10 High topics that were in Key section.
This leaves 5 more possible High topics.
Out of the remaining topics (those not in key section), the highest 5 topics are now High.
The rest are unchanged from the previous stage Example 2 doc has 10 High topics
15 topics were found in Key section
8 of the Key section topics were High: those are unchanged
the other 7 Key section topics were medium: only the highest 2 of those (=with highest annotation number) are boosted up to High
the remaining 5 Key section Medium topic stay Medium
Other topics unchanged Topic Scoring—SUSTY
  HIGH:
    Rule 1: N1=ApT*1000; with ApT=# annos/# tokens
    Rule 2: N2=# annotations*C1 (C1 is a scaling parameter that may defined through a calibration exercise based upon a corpus of documents).
    # Major topics=Min (N1,N2)
  MEDIUM: topics below Major but with more than a lower threshold (lower_threshold=5) of annotated sentences.
  LOW: topics mentioned with less than lower_threshold
b) For finAR Documents:
  If document has more than 40 topics:
    Top 30%: High
    Above 4 annotations: Med
    4 annotations or less: Low
  If document has between 20 and 40 topics:
    Top 30%: High
    Above 3 annotations: Med
    3 annotations or less: Low If document has less than 20 topics:
   Above 2 annotations: High
   2 annotations or less: Low
c) For SEC Documents:
   If document has 10 topics or more:
      Top 30%: High
      Above 1 annotation: Med
      1 annotation: Low
   If document has less than 10 topics:
      Above 1 annotation: High
      1 annotation: Low
d) For Integrated Documents:
   The same rules for Susty are used here.

It will be appreciated that the numeric values above (for example, top 30% are assigned a high classification) are provided by way of example only and that alternative values may be utilised.

After the scores have been assigned key section identification may be used to modify some scores.

Cross-Document Summarization (Step 403)

In one embodiment, a user can select any combination of document sources to look at. The following rules are applied to obtain summarized results from more than one document type:

Topic Ranking
   2 pools of report types are defined:
   Pool A: Annual Financial report, SEC filing, Integrated report
   Pool B: Sustainability report
   Summary within pool: For each topic, within a pool, the score is the highest of its components' score.
      So, in case of 2 documents for the same company, one SEC the other one Financial Report, the Score for a given topic is the maximum value the topic has between those 2 docs.
   Summary across Pools: for each topic:
      if A>B (i.e. financial reports score a topic higher), Total score=score of A
      if B>A (i.e. susty report ranks topic higher), Total score=Ceiling(mean(A, B)).
         Note that if a topic is present in B but not in A, since A exist (e.g at least one report exist in Pool A but does not mention the topic), Total score=ceiling(mean(A,0))
      if B (or A) does not exist, then Total score=Score (A) (or Score B)

HitPercent Metric:
   Represents the proportion of all 'hits' (an instance of one annotated sentence for one topic—one sentence can have only one hit per topic but can have 3 hits if it covers 3 topics).

The sum of all hits may be used as a baseline to assess the relative importance/relevance of a topic in this particular document, and then the topic's 'Hit %' value can be used to track over time the evolution of this proportion over time (by comparing the same type of document for an entity at different times) and across entities/companies (by comparing the same type of document for different entities/companies).

The number of annotated sentences for each topic is exported after the main NLP process into a CSV file.

HitPercent=[# Topic Hit Sentence]/[Total # Hit Sentence]

Example

All 'sum' values for document add up to 85;
Topic x has a 'sum' of 24 hits;
Topic x's 'Hit %' value is (24/85)*100≈28.24%

An example will now be described with reference to FIGS. 5 to 13 and in relation to the following document types:
1—Sustainability report (originally in pdf format) note: Financial annual reports and Integrated reports are of the same type—the difference is only in the way the topics' scores are calculated. The steps described for Sustainability reports processing are therefore identical if the report is an Integrated or Annual financial report.
2—SEC filing: 10k (originally in html format)
3—SEC filing: 20f (originally in html format)

FIG. 5 illustrates tokenization and part-of-speech tagging for a sustainability report.

Tokens are shown in yellow (for example, "Mexico" 500*a* and "Joint" 500*b*).

And details on each token are shown in table 501 where 'category'=identified part-of-speech.

FIG. 6 illustrates annotation of sentences with terms from the ontology.

Annotations are shown in pink (for example, "climate change" 600*a* and "people and operations safe" 600*b*).

Details of the annotations are shown in table 601, including the structure from the ontology (which topic, bucket and category they belong to) and specifications such as precise location of the term and ID.

FIG. 7 illustrates the CSV document exported after the NLP process.

All annotation details are exported to a CSV file that is then processed through various scripts. Column 700 shows the terms that match FIG. 6's annotated terms.

FIG. 8 illustrates topic score calculation based upon the exported CSV document.

A script calculates topics' scores based on the CSV file and a file containing document-level specifications (incl. number of tokens and annotations).

As shown in FIG. 8, the document contains 31685 tokens, the document contains 1281 annotations, the scaled AnnoPerToken value is 41, and the second '0.03 coefficient' is 39: this means this document will have 39 High topics.

FIG. 9 shows a table listing the topics located in the document and showing the associated scores calculated for each topic in column 900 and the high/medium/low classification for each topic shown in column 901 (3 denote the topic is classified as high, 2 denote the topic is classified as medium, and 1 denote the topic is classified as low).

FIG. 10 illustrates tokenization and part-of-speech tagging for a 10K report.

Tokens are shown in yellow (for example, "United" 1000*a* and "States" 1000*b*).

And details on each token are shown in table 1001 where 'category'=identified part-of-speech.

FIG. 11 illustrates section identification within the 10K report.

Only sections shown in red are matched to terms (for example, 1100).

And details on each section are shown in table 1101.

FIG. 12 illustrates annotation of sentences with terms from the ontology.

Annotations are shown in pink (specifically, "equal employment" 1200*a* and "commodity" 1200*b*).

Details of the annotations are shown in table 1201, including the structure from the ontology (which topic, bucket and category they belong to) and specifications such as precise location of the term and ID.

A visualization of a Gazetteer is shown in FIG. 13.

Language Processing Rules Library

As part of the NLP process, a set of processing rules may be activated and applied depending on the stage and type of document.

Footer Rule

Identifies the footers of a document by determining sentences of the document that occur most frequently.

Flags topic annotations appearing in the footer so as not to include them.

Negative Topic

Identifies topic annotations which have negative connotations by identifying negators surrounding them.

Strong Topic

Identifies topic annotations with positive connotations by identifying ones that have forms surrounding them that reinforce the topic.

Table of Contents

Identifies the table of contents in a document by searching for various string sequences and structures that would appear in a table of contents.

An example of such a sequence is "1. Introduction 2. Stakeholders

Merge Topics

Merges annotations of a topic from different terms that appear next to each other into one annotation.

Merges a topic annotation appearing next to it's parent topic so that the more specific one (further down the tree) remains.

'... reducing our emission factor'... both 'emission' and 'emission factor' are terms that appear under the same topic, Emissions(general). They will count as one annotation instead of 2.

'... implement policies to connect corporate and societal values...' both 'societal values' and 'connect corporate and societal value' are terms under the same topic 'enhanced value'. They will count as one annotation.

Merging only occurs amongst terms that belong to the same topic.

GRI Framework Identification

Identifies the Global Reporting Initiative identifiers to link the report's topics and GRI's framework. (locates GRI topic indicator (e.g. 'EN18', 'LA5'), tags paragraph corresponding to this GRI topic)

Key Sentences

Identifies sentences with X or more annotated topics appearing in them.

Key Paragraph

Identifies the paragraph/s that have the highest density of key sentences.

Page Number of Sentence

For each sentence, adds metadata regarding the page it occurs on.

The same is also done for topic annotations.

Key Section SEC

Identify the string 'ITEM' followed by a number between 0 and 99 and then an A or a B and potentially a period.

Add the number to each item tag.

Use the tags to identify different key sections of the SEC document, based on a known structure of these documents, and knowledge of which sections are of interest to us.

Collocation

Will be used for two purposes:

1. identifying topics that occur next to each other (in same sentence &/or same paragraph)—for ontology analysis, research and topics-tracking purposes;

2. identifying co-occurrences of different strategic levels for one given topics ('aware' vs 'action')—this can be used for assessing report quality and the maturity level of the company w.r.t. specific topics.

CEO Letter Identification

The following steps are used to identify letters from senior management (i.e. CEO, Chairman, etc.) in Sustainability and Integrated reports:

1. Apply an ontology of potential terms and phrases that appear at the start and end of letters, based on analysis of a large sample of these documents.

2. Apply a set of language processing rules that utilize the annotations from (1) and knowledge of the semantic structure of starts and ends of letters to identify and annotate potential starts and ends.

Example 'start': Letter from James Jameson, CEO . . . .

The above rule would detect an instance of one of the strings indicating a 'message', followed by the name of a person, potentially a comma, and then the title of a leader.

3. Next, a set of rules would be applied to filter out starts and finishes that occur past page 15 and in the middle of the page, depending on which of the rules from phase 2 were triggered.

4. The next set of rules identify the entire content of the letter based on the remaining starts and finishes. A staggered approach is taken where the following rules are applied in succession:

a) The first start is chosen and the furthest finish within the following 5 pages is found and all of the content in-between is annotated.

b) If the previous rule is not triggered, every start is found and the page containing it is annotated.

c) If neither a) or b) are triggered, find all ends in the document and annotate the page containing them.

5. Flag all topic annotations appearing in a CEO letter.

6. Boost topics appearing in CEO letter in post NLP computation.

A potential advantage of some embodiments of the present invention is that relevant topics within data or documents comprising text can be more accurately identified, particularly, in specific fields. This improve data processing technology can lead to superior classification of documents and, therefore, better searching or analysis of those documents.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method of processing data comprising text, the method performed by at least one processor and including:
    extracting the text in the data;
    parsing the extracted text;
    tokenising the parsed text within at least one part of the data;
    matching tokenised text against terms in an ontological framework, the ontological framework include a plurality of categories, each category associated with a plurality of topics, each topic associated with a plurality of terms, and each category is associated with a plurality of rules;
    based on the matching, classifying the at least one part of the data into one of the plurality of categories;
    based on the matching and rules associated with the category into which the at least one part of the data is classified, identifying topics within the data from the plurality of topics;
    based on a number of associations within the data for each identified topic and the rules associated with the category into which the at least one part of the data is classified, assigning a relevance for each identified topic; and
    annotating the at least one part of the data with the topics and the assigned relevance, wherein a predetermined percentage of the identified topics are assigned a highest relevance.

2. A method as claimed in claim 1, wherein at least some of the plurality of rules relates to grammar.

3. A method as claimed in claim 1, wherein the relevance of each of the topics identified across a plurality of parts of the data is assigned one of a plurality of relevancy levels.

4. A method as claimed in claim 1, wherein the data includes a plurality of documents and for each documents, a score is assigned per identified topic.

5. A method as claimed in claim 1, wherein each category of the plurality of categories is associated with at least one relevancy rule, and wherein each identified topic is assigned to one of a plurality of relevancy levels in accordance with the at least one relevancy rule associated with the category into which the at least one part of the data is classified.

6. A method as claimed in claim 1, wherein the data is comprised of a plurality of parts and the data is classified into the category into which the at least one part of the data is classified.

7. A method as claimed in claim 1, wherein the data is extracted from one of a plurality of sources.

8. A method as claimed in claim 7, wherein each source corresponds to one of the plurality of categories.

9. A method as claimed in claim 1, wherein the method is applied to a plurality of data and at least some of the plurality of data is classified within different categories of the plurality of categories.

10. A method as claimed in claim 9, further including a step of determining relevant topics across the plurality of data using a plurality of further rules.

11. A method as claimed in claim 10, wherein at least some of the plurality of further rules are associated with a specific category of the plurality of categories and are used in relation to data within that specific category.

12. A method as claimed in claim 1, wherein the categories include one or more selected from a set of sustainability reports, financial reports, security filings, integrated reports and sustainability web sites.

13. A method as claimed in claim 1, wherein at least one of the plurality of rules specifies only tokenised text within specified portions of the data are matched against the ontological framework.

14. A system for processing data, including:
    at least one memory configured for storing data comprising text, ontological framework and a plurality of rules, the ontological framework include a plurality of categories, each category associated with a plurality of topics, each topic associated with a plurality of terms, and each category is associated with rules of the plurality of rules; and
    at least one processor configured for:
    extracting the text in the data;
    parsing the extracted text;
    tokenising the parsed text within at least one part of the data;
    matching tokenised text against terms in an ontological framework;
    based on the matching, classifying the at least one part of the data into one of the plurality of categories;
    based on the matching and rules associated with the category into which the at least one part of the data is classified, identifying topics within the data from the plurality of topics;
    based on a number of associations within the data for each identified topic and the rules associated with the category into which the at least one part of the data is classified, assigning a relevance for each identified topic; and
    annotating the at least one part of the data with the topics and the assigned relevance, wherein a predetermined percentage of the identified topics are assigned a highest relevance.

15. A method of processing data comprising text, the method performed by at least one processor and including:
    extracting the text in the data;
    parsing the extracted text;
    tokenising the parsed text within at least one part of the data;
    matching tokenised text against terms in an ontological framework, the ontological framework include a plurality of categories, each category associated with a plurality of topics, each topic associated with a plurality of terms, and each category is associated with a plurality of rules;
    based on the matching classifying the at least one part of the data into one of the plurality of categories;
    based on the matching and rules associated with the category into which the at least one part of the data is classified, identifying topics within the data from the plurality of topics;
    based on a number of associations within the data for each identified topic and the rules associated with the category into which the at least one part of the data is classified, assigning a relevance for each identified topic; and
    annotating the at least one part of the data with the topics and the assigned relevance, wherein the identified topics having a number of associations above a preset value are assigned a high relevance, and remaining identified topics are assigned a low relevance.

16. A method of processing data comprising text, the method performed by at least one processor and including:
   extracting the text in the data;
   parsing the extracted text;
   tokenising the parsed text within at least one part of the data;
   matching tokenised text against terms in an ontological framework, the ontological framework include a plurality of categories, each category associated with a plurality of topics, each topic associated with a plurality of terms, and each category is associated with a plurality of rules;
   based on the matching, classifying the at least one part of the data into one of the plurality of categories;
   based on the matching and rules associated with the category into which the at least one part of the data is classified, identifying topics within the data from the plurality of topics;
   based on a number of associations within the data for each identified topic and the rules associated with the category into which the at least one part of the data is classified, assigning a relevance for each identified topic; and
   annotating the at least one part of the data with the topics and the assigned relevance, wherein multiple matching terms associated with one topic within a single sentence is weighed the same as a single matching term associated with the topic in a sentence, and the relevance is assigned based on the weighing of the matching terms.

* * * * *